United States Patent [19]

Marmin

[11] Patent Number: 5,797,531
[45] Date of Patent: Aug. 25, 1998

[54] DIFFERENTIAL-PRESSURE TURNER BAR CONFIGURATION

[75] Inventor: Jean-Claude Marmin, Estrees-Saint-Denis, France

[73] Assignees: Heidelberger Druckmaschinen AG, Heidelberg, Germany; Heidelberg Harris S.A., Montataire Cedex, France

[21] Appl. No.: 736,375

[22] Filed: Oct. 24, 1996

[30] Foreign Application Priority Data

Oct. 24, 1995 [FR] France .................... 95 12506

[51] Int. Cl.⁶ .................... B65H 23/32; B65H 20/00
[52] U.S. Cl. .................... 226/97; 226/197
[58] Field of Search .................... 226/10, 97, 196, 226/197; 242/615

[56] References Cited

U.S. PATENT DOCUMENTS

| | | | |
|---|---|---|---|
| 3,567,093 | 3/1971 | Johnson | 226/197 |
| 4,288,015 | 9/1981 | Curtin | 226/197 |
| 5,273,207 | 12/1993 | Hambrecht | 226/197 |
| 5,316,199 | 5/1994 | Hansen et al. | 226/197 |
| 5,520,317 | 5/1996 | Eckert et al. | 226/197 |

FOREIGN PATENT DOCUMENTS 522 157  6/1972  Switzerland .

OTHER PUBLICATIONS

Patent Abstract of Japan, vol. 13, No. 177 (M-818) Apr. 26, 1989; & JP-A-1008368 (Suzuki) Mar. 12, 1989.

*Primary Examiner*—Charles A. Marmor
*Assistant Examiner*—Matthew A. Kaness
*Attorney, Agent, or Firm*—Herbert L. Lerner; Laurence A. Greenberg

[57] ABSTRACT

A turner bar has a hollow space that can be connected to a compressed air source, for deflecting a printed web of material. Closable and openable air outlet openings are disposed on a turner bar jacket. When a web is present above the air outlet openings of the turner bar, a counterpressure that builds up below the web effects a displacement of a movable opening and closing element, in such a way that an air supply is released.

10 Claims, 3 Drawing Sheets

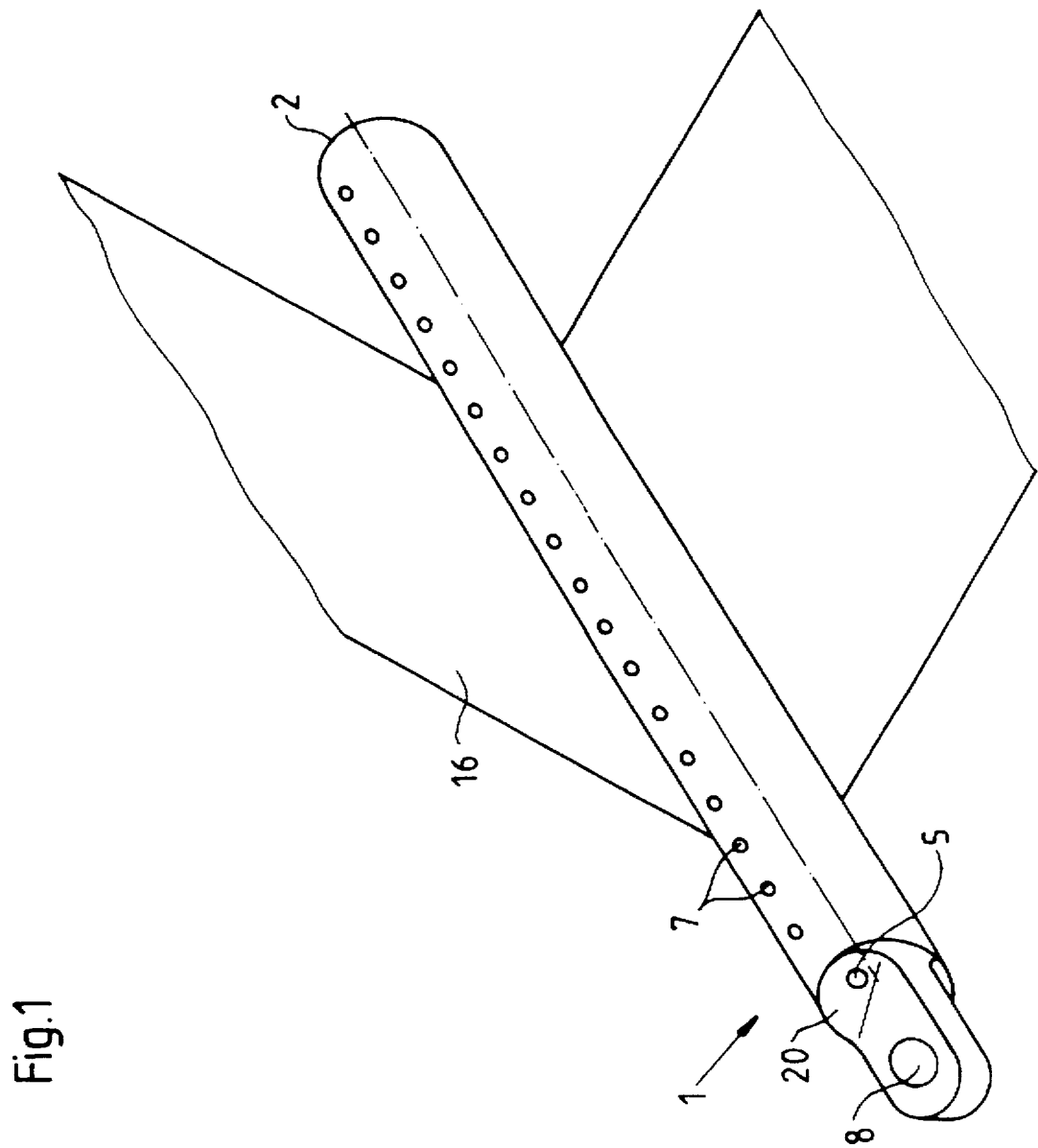

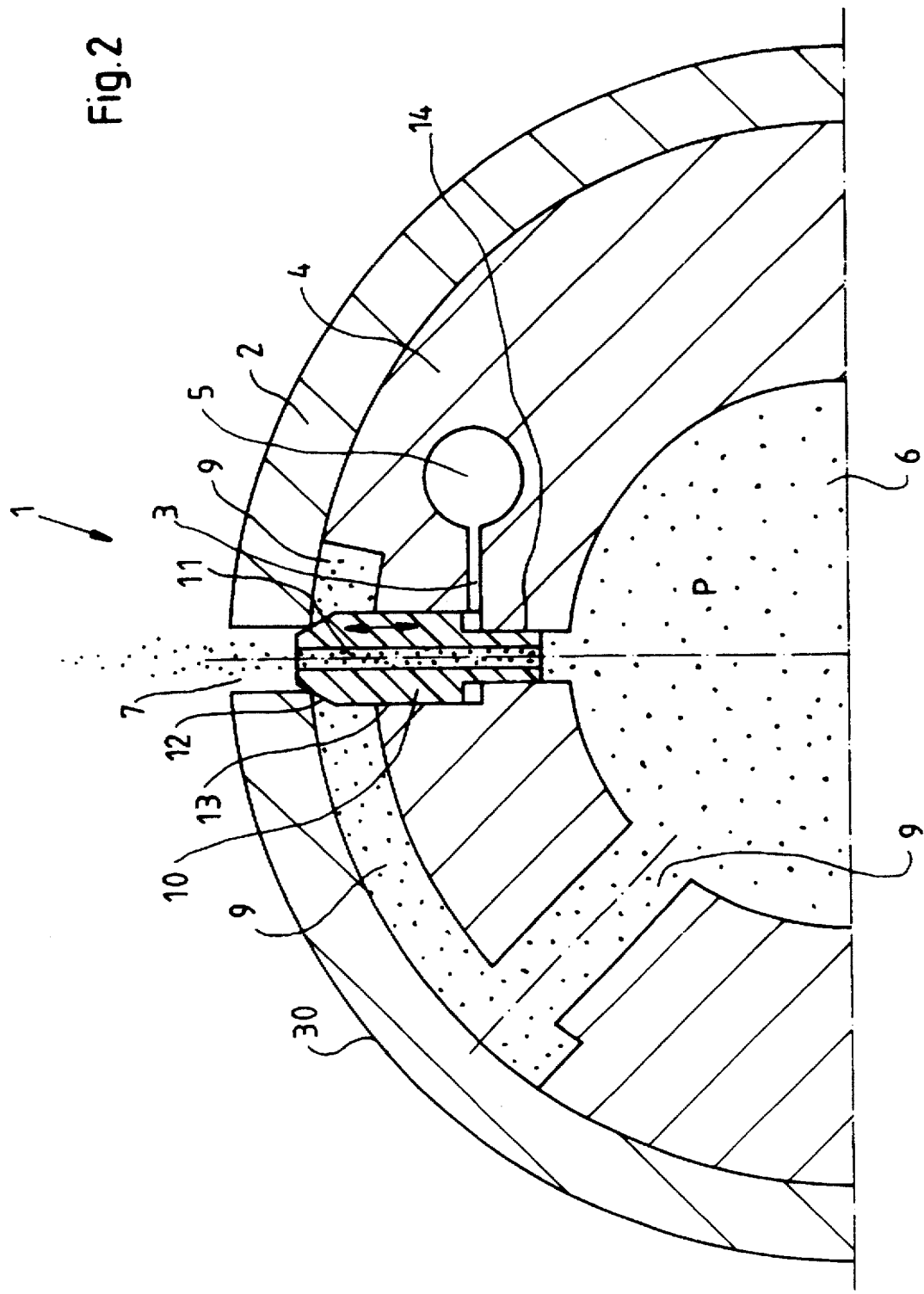

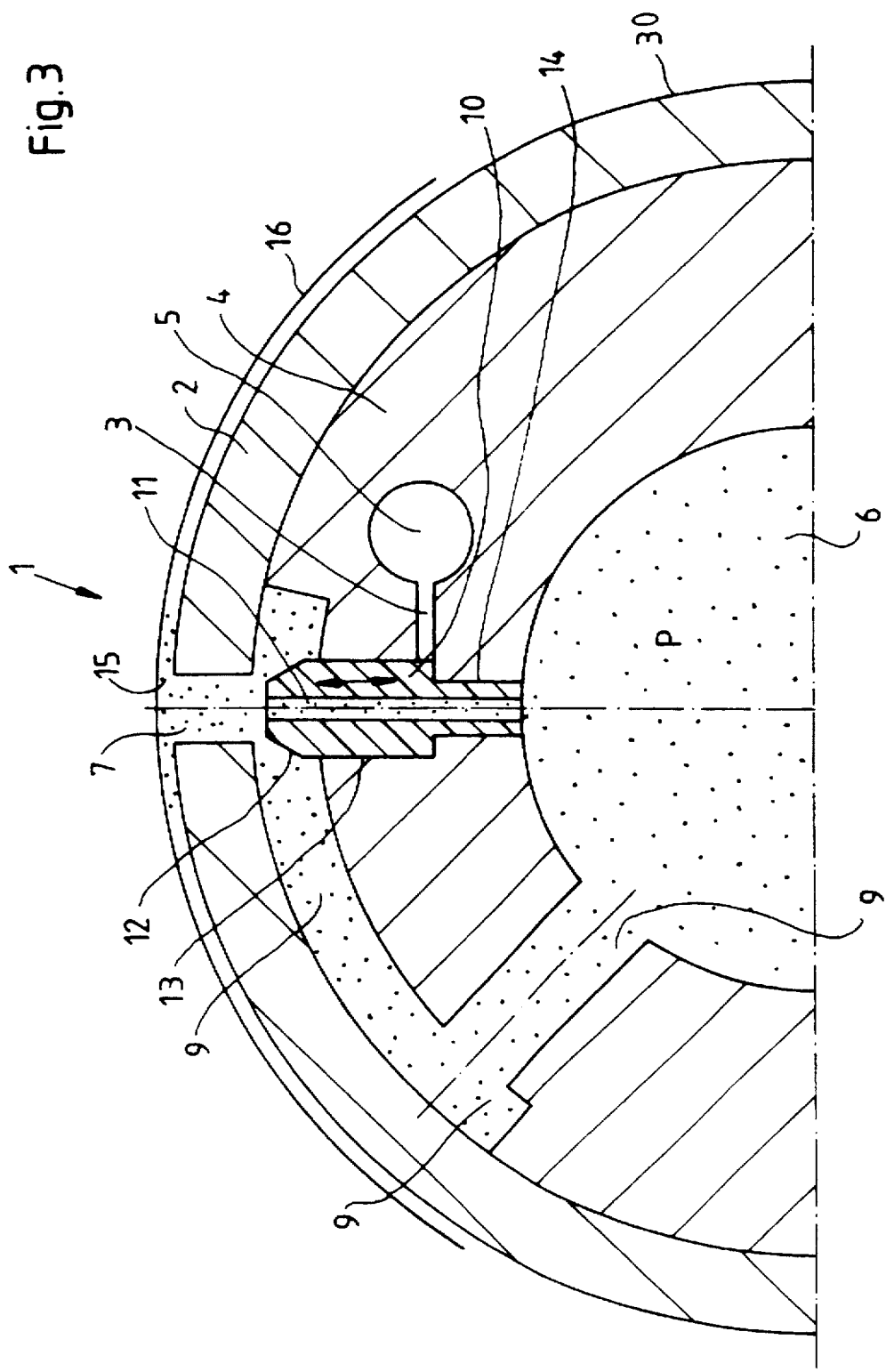

DIFFERENTIAL-PRESSURE TURNER BAR CONFIGURATION

BACKGROUND OF THE INVENTION

Field of the Invention

The invention relates to a turner bar configuration for deflecting printed webs of material before they pass from a rotary printing press into a downstream further-processing unit.

German Published, Non-Prosecuted Patent Application DE 32 15 472 A1 shows a turner bar bathed with air. In order to close off unneeded air outlet holes in air-based turner bars, individual internal lengths of tubing disposed side by side in axial direction are used in an outer tube of the turner bar. They are axially fixed but are rotatable in the circumferential direction. Openings or slits extending in the circumferential direction, are provided in the internal lengths of tubing.

Each of the internal lengths of tubing is assigned an opening that pierces the outer tube, through which the particular internal length of tubing located below the recess can be brought from outside by an adjusting device into the desired circumferential position, so that the unneeded air outlet holes in the outer tube can be covered, or can be opened if the slit in the internal length of tubing corresponds with an air outlet hole in the outer tube.

German Utility Model DE 32 25 922 G2 relates to a variable width compressed-air-impinged turner bar with an outer tube that has air outlet holes and with a device disposed in the outer tube for selectively closing certain air outlet holes. In the tube, a flexible strip extending axially of the turner bar and pressing against the air outlet holes is disposed below the air outlet holes. It has a longitudinal slit and is movable in the axial direction by a displacement device.

German Patent DE 34 36 870 C1 discloses an air-bathed turner bar for rotary printed presses. A tubular turner bar for rotary printing presses for deflecting a printed web of paper has nozzle-like outlet bores, in a semicylindrical deflection region, for forming an air cushion under the web of paper. In its hollow chamber, a device for adjusting the width of the air cushion is provided and has two spaced-apart pistons that are longitudinally adjustable independently of one another. In order to accurately limit the air cushion to the deflection region of the paper web, each piston is provided, on its end surface facing toward the other piston, with a sheathlike attachment having an outer diameter which adapts to the piston diameter. The outer end surface of that attachment is beveled in accordance with a course of the associated paper web edge which before that is guided around and outside the turner bar.

German Published, Non-Prosecuted Patent Application DE 41 17 094 A1, corresponding to U.S. Pat. No. 5,273,201, relates to a compressed-air-supplied turner bar for deflecting webs of goods in rotary printing presses. The turner bar is disposed so as to be displaceable on crossbars on bearing bodies. Air outlet openings are provided over the circumference of the turner bar. A piston moves on at least one adjusting spindle that is supported in the turner bar and has an air conduit. Air outlet openings are formed in the jacket surface of the piston, in axially extending rows of different lengths.

Finally, German Published, Non-Prosecuted Patent Application DE 43 35 051 A1 discloses a turner bar for a paper web having a closure device for air outlet holes. In order to accomplish the closing, that device on one hand has many flexible diaphragms, each accommodated in the interior of the turner bar, and on the other hand it has many operating controls, which are disposed displaceably and in sealed fashion in the wall of the turner bar relative to the air outlet holes. Each of the operating controls, which are actuatable from outside, is firmly connected to a flexible diagram, as a result of which the diaphragm can assume two positions. In a first position, the flexible diaphragms cover the entire cylindrical inner surface of the bar, so that all of the outlet holes are closed. In a second position, in which the flexible diaphragms are pressed against the cylindrical inner half surface, which faces the half surfaces having the outlet holes, the outlet holes are opened up.

All of those devices in the prior art have the disadvantage on one hand of requiring that the boundary of the emerging air cushion be limited to the width of the web through the use of complicated and expensive displaceable pistons or systems of strips. On the other hand, the adjustment of the width of the air cushion is also carried out manually, for which purpose a printer must climb up into the superstructure above the turner bar every time in order to adjust the control elements accordingly.

SUMMARY OF THE INVENTION

It is accordingly an object of the invention to provide a differential-pressure turner bar configuration, which overcomes the hereinafore-mentioned disadvantages of the heretofore-known devices of this general type and which automatically adjusts an air cushion supporting a web of material to a web width due to the presence of a web, at the cost of only minimal leakage losses.

With the foregoing and other objects in view there is provided, in accordance with the invention, a turner bar, comprising a hollow space to be connected to a compressed air source for deflecting a printed web of material; a turner bar jacket having closable and openable air outlet openings disposed thereon; and a movable opening and closing element having a pressure line, the opening and closing element being moved by a counterpressure building up below a web of material above the air outlet openings for releasing an air supply.

A circumstance of particular advantage in this embodiment is that the air cushion adjusts itself as a function of the web width to be handled, without needing complicated remote-controllable components inside the turner bar. Since a counterpressure that regulates the air supply builds up only wherever the air outlet openings of the turner bar are covered by the web of material, the tedious and difficult job of climbing into the turner bar superstructure can also be omitted since the air cushion is self-adjusting.

In accordance with another feature of the invention, the turner bar according to the invention includes a turner bar body and a turner bar jacket sheathing it.

In accordance with a further feature of the invention, the air outlet openings are located in the turner bar jacket.

In accordance with an added feature of the invention, the opening and closing element, which is similar to a valve body, is movably received in the turner bar body.

In accordance with an additional feature of the invention, a hollow chamber, which communicates with a compressed air source, and a bypass system, are also located in the turner bar body. The hollow chamber in the turner bar body communicates both with the bypass system and with a bore in the opening and closing element.

In accordance with yet another feature of the invention, the opening and closing element is guided vertically in a guide in the turner bar body. The opening and closing element may also be provided with a centering device.

In accordance with again another feature of the invention, there is provided a conduit and an opening through which the guide communicates with the atmosphere for aerating and ventilating the guide.

In accordance with yet a further feature of the invention, the opening and closing element is equipped with a closing cone in order to provide better partitioning off of the air supply from an air outlet opening.

In accordance with yet an added feature of the invention, the opening and closing element is essentially movable between two positions. In an extended position, it separates the air outlet opening in the turner bar jacket from the bypass system, while in a retracted position it enables the air supply through the bypass system.

In accordance with yet an additional feature of the invention, the opening and closing element has a bore formed therein, and the opening and closing element divides the bypass system from the air outlet opening and compressed air flows out solely through the bore, in the absence of a web of material above the air outlet openings.

In accordance with yet a concomitant feature of the invention, the opening and closing element may be formed of rubber or metal or may be manufactured from an elastomer compound. The opening and closing element may also be constructed as a rubber diaphragm.

Other features which are considered as characteristic for the invention are set forth in the appended claims.

Although the invention is illustrated and described herein as embodied in a differential-pressure turner bar configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, perspective view of a web of material guided by a turner bar;

FIG. 2 is an enlarged, cross-sectional view showing a bypass system which is closed by an extended opening and closing element, as well as leaking air flowing through a pressure line; and FIG. 3 is a view similar to FIG. 2 showing an air cushion that builds up below a web of material and has a counter-pressure through which the opening and closing element opens the bypass system.

DESCRIPTION OF THE PREFERRED EMBODIMENTS

Referring now to the figures of the drawings in detail and first, particularly, to FIG. 1 thereof, there is seen a turner bar 1 having a turner bar jacket 2 in which many air outlet openings 7 are provided. The turner bar 1 is secured in a non-illustrated superstructure through the use of a mount 8. A mount which is provided on the side opposite the mount 8 is not shown. A web 16 of material moves above the turner bar jacket 2 over the turner bar 1 on an air cushion that prevents ink from being deposited on the periphery of the turner bar jacket 2.

FIG. 2 shows a fragmentary cross section through the turner bar 1 according to the invention, from which it can be seen that the turner bar includes not only the turner bar jacket 2 but also a turner bar body 4. The multiplicity of air outlet openings 7 which are provided in the turner bar jacket 2 are disposed one above the other in rows. The individual rows of air outlet openings 7 may be disposed about the circumference of the turner bar jacket 2 at intervals of 90°, 180°, 270°, 360°, or other intervals. A conduit 5 which extends parallel to the axis of the turner bar 1 communicates with the atmosphere through a bore 20 at its end, as is shown in FIGS. 1 and 2. The function of this conduit will be explained in further detail in conjunction with FIGS. 2 and 3.

A hollow chamber 6 which is provided in the turner bar or roller body 4 communicates with a source of compressed air and is acted upon by a pressure P. The turner bar body 4 moreover has a bypass system 9, which discharges below the air outlet openings 7 in the turner bar jacket 2. A guide 13 is also provided in the turner bar body 4. An opening and closing element 10 is received in the guide 13 so as to be movable in the direction of a double arrow. A bore or pressure line 11 which is provided in the opening and closing element 10 likewise communicates with the hollow chamber 6 in the turner bar body 4. An air volume continuously emerges by way of the bore 11, due to the pressure P in the hollow chamber 6. The turner bar body 4 may moreover be provided with a centering device 14, through which the opening and closing element 10 can be centered in its guide 13. The opening and closing element 10, which acts as a valve body, has an upper end that is provided with a closing cone 12. The closing cone 12 presses against a lower edge of the turner bar jacket 2 at the air outlet opening 7 when the opening and closing element 10 is extended and thus separates the air outlet opening 7 from the bypass system 9. The opening and closing element 10 may be formed of rubber, metal or an elastomer mixture and may have a circular cross section. Naturally, other geometries would also be possible, such as the use of a rubber diaphragm as an opening and closing element 10.

In the condition shown in FIG. 2, compressed air flows out solely through the bore 11 in the opening and closing element 10. The bypass system 9 is divided or separated from the air outlet opening 7 in the turner bar jacket 2 by the opening and closing element 10. As a result of the overpressure P prevailing in the interior of the hollow chamber 6, the opening and closing element 10 is thrust upward in its guide 13, until the closing cone 12 presses against the lower edge of the turner bar jacket 2 at the air outlet opening 7.

A lower region of the guide 13 communicates through a conduit 3 having a small diameter, with the conduit 5 that in turn communicates through the bore 20 with the atmosphere. As a result, the opening and closing element 10 can move unhindered in its guide 13. Particularly in the case where the opening and closing element 10 is pressed upward, enough air can flow in again from outside through the small-diameter conduit 3 and through the conduit 5, that an overpressure which would impede the extension of the opening and closing element 10 cannot develop in the guide 13 below the opening and closing element.

In the condition shown in FIG. 3, a web 16 of material has reached the turner bar jacket 2 and covers the air outlet openings 7 formed therein. The volume of air continuously emerging from the bore 11 forms an air cushion 15 in the air outlet opening 7 and adjoining regions on the turner bar jacket 2 below the web 16. A counterpressure in the air outlet opening 7 generated by this air cushion 15, which thus far has been supplied essentially by the continuously emerging compressed air from the bore 11, causes a partial retraction of the opening and closing element 10 in its guide 13. As a result, the air supply through the bypass system 9 to the air outlet opening 7 is enabled, and a greater volume of air then flows in beneath the web 16 because of the pressure P in the hollow chamber 6. In the downward motion of the opening and closing element 10, the air trapped between it and the guide 13 can flow out into the open through the small cross section conduit 3, the conduit 5 and the bore 20 on the end of the latter. Through the use of the conduits 3 and 5 it is thus assured that an overpressure which would impede the vertical motion of the opening and closing element 10 cannot build up in the guide 13. A removal of the web 16 from an upper surface 30 of the turner bar jacket 2 causes the counterpressure in the air outlet openings 7 to collapse abruptly, and as a result the opening and closing element 10 makes an upward motion which closes the bypass system 9 again.

If the web 16 covers a row of side by side air outlet openings 7 in the turner bar jacket 2, then as a result of its presence above all of these air outlet openings 7, the bypass system 9 is unblocked in the manner described above, so that an air cushion 15 which supports the web 16 without contact is created between the underside of the web and the surface 30 of the turner bar jacket 2. In the regions on the turner bar jacket 2 that are not covered by the web 16, an air cushion is incapable of forming because of the lack of a buildup of counterpressure, since no web 16 extends along there. In these regions, a small volume of air continuously flows out through the bores 11 of the opening and closing elements 10.

I claim:

1. A turner bar, comprising:

a turner bar body;

a turner bar jacket enclosing said turner bar body, said turner bar jacket having closable and openable air outlet openings formed therein;

a hollow space formed within said turner bar jacket to be connected to a compressed air source for conveying compressed air for deflecting a printed web of material;

a movable opening and closing element disposed in said turner bar body for selectively opening and closing said air outlet openings from within the interior therein, said opening and closing element having a conduit formed therein and being moved to an open position by a pressure gradient caused by a presence of a web of material above said air outlet openings.

2. The turner bar according to claim 1, wherein said hollow space is a pressure-impinged hollow chamber in said turner bar body communicating fluidically with said air outlet openings through said conduit formed in said movable opening and closing element, and including a bypass system through which said hollow space communications fluidically with said air outlet openings when said opening and closing element is in an open position.

3. The turner bar according to claim 2, wherein said conduit is a bore formed in said opening and closing element, and said opening and closing element separating said bypass system from said air outlet opening and compressed air flowing out solely through said bore, in the absence of a web of material above said air outlet openings.

4. The turner bar according to claim 1, including a guide in which said opening and closing element is vertically guided.

5. The turner bar according to claim 4, including a conduit and an opening for providing an air path between said opening and closing element and the atmosphere for aerating and ventilating air to and from said opening and closing element.

6. The turner bar according to claim 1, wherein said opening and closing element has a closing cone.

7. The turner bar according to claim 1, wherein said opening and closing element is formed of rubber.

8. The turner bar according to claim 1, wherein said opening and closing element is formed of elastomer compounds.

9. The turner bar according to claim 1, wherein said opening and closing element is a rubber diaphragm.

10. A turner bar, comprising:

a turner bar body having a hollow chamber formed therein to be connected to a compressed air source;

a turner bar jacket enclosing said turner bar body, said turner bar jacket having air outlet openings formed therein;

an opening and closing element disposed in said turner bar body for opening and closing said air outlet openings from within the interior therein, said opening and closing element having a conduit and being moved within said turner bar body by a pressure gradient caused by a web of material above said air outlet openings to an opened position; and a bypass system formed in said turner bar body;

said hollow chamber providing compressed air to said bypass system and said opening and closing element such that said hollow chamber providing compressed air to said air outlet openings when said opening and closing element is in an open position.

* * * * *